United States Patent [19]

Iwata et al.

[11] Patent Number: 5,547,216
[45] Date of Patent: Aug. 20, 1996

[54] CRUSH SENSOR

[75] Inventors: Hitoshi Iwata; Tatsuya Ishida, both of Aichi-ken, Japan

[73] Assignee: Kabushiki Kaisha Tokai-Rika-Denki-Seisakusho, Aichi-ken, Japan

[21] Appl. No.: 377,936

[22] Filed: Jan. 25, 1995

[30] Foreign Application Priority Data

Mar. 4, 1994 [JP] Japan .................................. 6-034749

[51] Int. Cl.⁶ ................................................. B60R 21/32
[52] U.S. Cl. ...................... 280/734; 280/735; 280/730.2; 180/274
[58] Field of Search ..................... 280/735, 734, 280/730.2; 180/274, 275–278; 222/3; 73/262, 729.2, 52

[56] References Cited

U.S. PATENT DOCUMENTS

| 3,889,232 | 6/1975 | Bell ......................... 280/735 |
| 4,176,858 | 12/1979 | Kornhauser ............. 280/734 |
| 4,676,402 | 6/1987 | Stetson ........................ 222/3 |
| 4,869,077 | 9/1989 | Tattmann et al. ........... 73/52 |
| 4,995,639 | 2/1991 | Breed ...................... 280/735 |
| 5,145,208 | 9/1992 | Hoagland et al. ........ 280/734 |
| 5,375,877 | 12/1994 | Yoshida et al. .......... 280/735 |
| 5,398,965 | 3/1995 | Gierlando et al. ....... 280/735 |
| 5,419,407 | 5/1995 | Mayer et al. ........... 280/730.2 |

FOREIGN PATENT DOCUMENTS

| 4322488 | 5/1994 | Germany. |
| 48-41431 | 1/1971 | Japan. |
| 49-61833 | 7/1972 | Japan. |

*Primary Examiner*—Christopher P. Ellis
*Attorney, Agent, or Firm*—Sixbey, Friedman, Leedom & Ferguson

[57] ABSTRACT

A crush sensor has a crush box and a pressure sensor. The crush box is disposed between a vehicle-door outer panel and a door inner member which make up a vehicle door, such that a pressure-receiving surface of the crush box, which has a predetermined area, is opposed to the vehicle-door outer panel, the crush box being formed in a semi-sealed state. The pressure sensor detects the internal pressure of the crush box and outputs an electrical signal proportional to a detected value. Since the pressure sensor is capable of obtaining data corresponding to the crushing speed and the amount of crush by detecting the internal pressure of the crush box, an effect equivalent to that obtained by detecting the crushing speed and the amount of crush can be obtained with a simple arrangement without directly detecting them.

19 Claims, 4 Drawing Sheets

CRUSH SENSOR

BACKGROUND OF THE INVENTION

1. Field of the Invention

The present invention relates to a crush sensor, and more particularly to a crush sensor suitable as a sensor for controlling the operation of an actuator of such as an air bag for side collision of a vehicle.

2. Description of the Related Art

Conventionally, as a sensor for controlling the operation of an actuator of an air bag for side collision, a membrane switch array or a string-type pressure-sensitive element is used, and the operation of the actuator is controlled by detecting an amount of deflection.

With the above-described conventional example, however, there have been drawbacks in that, in order to detect the amount of deflection and the deflecting speed (which may be alternatively called the amount of crush and the crushing speed) of an entire pressure-receiving surface having a certain area, a planar sensor array is required, and a signal processing circuit or a signal processing program becomes complicated.

SUMMARY OF THE INVENTION

In view of the above-described circumstances, it is an object of the present invention to provide a crush sensor which, without directly detecting the amount of crush and the crushing speed, is capable of obtaining an effect equivalent to that obtained by detecting the same.

To this end, in accordance with the present invention, there is provided a crush sensor comprising: an air tank disposed between a vehicle-door outer panel and a door inner member which make up a vehicle door, such that a pressure-receiving surface of the air tank, which has a predetermined area, is opposed to the vehicle-door outer panel, the air tank being formed in a semi-sealed state; and a pressure sensor for detecting the internal pressure of the air tank and outputting an electrical signal proportional to a detected value.

The semi-sealed state of the air tank referred to herein means such a sealed state of the tank interior that a state of equilibrium between the pressures in and outside the air tank is maintained in the case of a gradual change in the internal pressure of the air tank due to an ordinary temperature change, but during a sudden change in the internal pressure such as when an impact load acts on the pressure-receiving surface and the air tank is crushed, the state of equilibrium between the pressures in and outside the air tank is destroyed so as to allow the internal pressure to change.

In accordance with the present invention, when a side-collision load acts on the vehicle-door outer panel and the vehicle-door outer panel is crushed, the impact load is applied to the pressure-receiving surface of the air tank, and the air tank is crushed, so that its internal pressure rises suddenly. At this time, the pressure sensor detects the rise in the internal pressure, and its output signal suddenly rises and changes in a short time.

It can be considered that the rising speed of the internal pressure at this time (more precisely, the relative pressure of the internal pressure with respect to the atmospheric pressure) is substantially proportional to the crushing speed, and that a maximum value of the internal pressure is substantially proportional to the amount of crush. Hence, an effect equivalent to that obtained by detecting the amount of crush and the crushing speed can be obtained without directly detecting them by measuring a change over time of the output signal from the pressure sensor and detecting the rising speed of the internal pressure (the rate of change of the rise in internal pressure over time) and a maximum value of the internal pressure.

The above and other objects, features and advantages of the present invention will become more apparent from the following detailed description of the invention when read in conjunction with the accompanying drawings.

DESCRIPTION OF THE PREFERRED EMBODIMENT

Hereafter, a description will be given of an embodiment of the present invention with reference to FIGS. 1 to 4.

Figure 1:
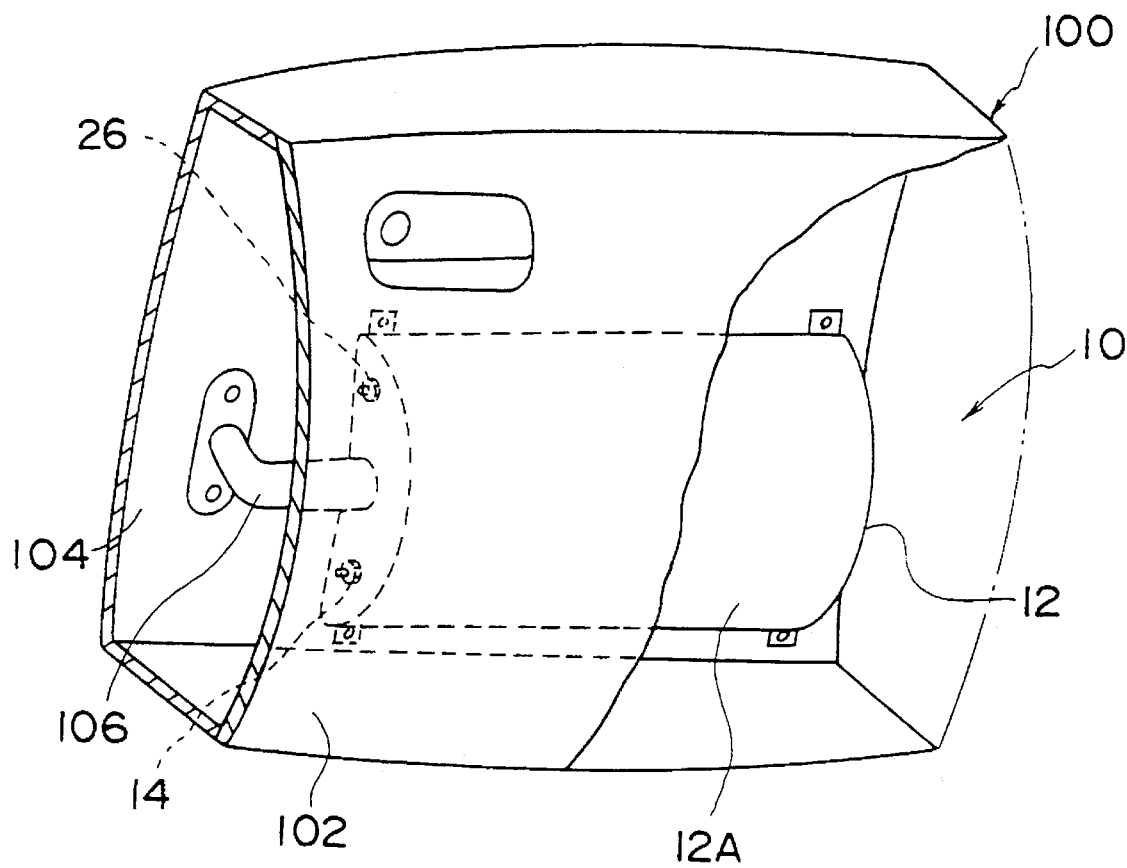
FIG. 1 is a schematic perspective view, partly broken away, of a vehicle door in which a crush sensor in accordance with an embodiment of the present invention is mounted.

FIG. 1 shows a vehicle door 100 in which a crush sensor 10 in accordance with the embodiment is mounted.

The crush sensor 10 is disposed between a vehicle-door outer panel 102 and a door inner member 104 which make up the vehicle door 100. As shown in an enlarged view in FIG. 2, this crush sensor 10 is comprised of a crush box 12, which is a substantially semicylindrical air tank having both ends closed, and a pressure sensor 14 which is attached to one side wall (the left side wall in FIG. 2) of the crush box 12.

In FIG. 1, the crush box 12 is formed in a rectangular shape in a plan view, and is disposed such that a pressure-receiving surface 12A having a predetermined area is opposed to the vehicle-door outer panel 102, while an opposite surface 12B (see FIG. 2) to the pressure-receiving surface 12A is opposed to the door inner member 104. A recessed portion 16 is formed in a heightwise intermediate portion of the surface 12B of the crush box 12 in such a manner as to extend in the longitudinal direction of the crush box 12, and brackets 18A, 18B, 18C, and 18D for mounting the crush box 12 to the door inner member 104 are disposed in the vicinities of the four corners, respectively, of the surface 12B. The recessed portion 16 is engaged with a side impact beam 106, which is disposed on the inner surface of the door inner member 104 of the vehicle door 100 in such a manner as to extend in the longitudinal direction of the vehicle and which serves as a reinforcing member. In this state, the crush box 12 is secured to the door inner member 104 by means of the mounting brackets 18A, 18B, 18C, and 18D.

In this embodiment, the crush box 12 is formed of a resin or a metal which is unlikely to crack when it is crushed upon application of an external force thereto.

Figure 2:
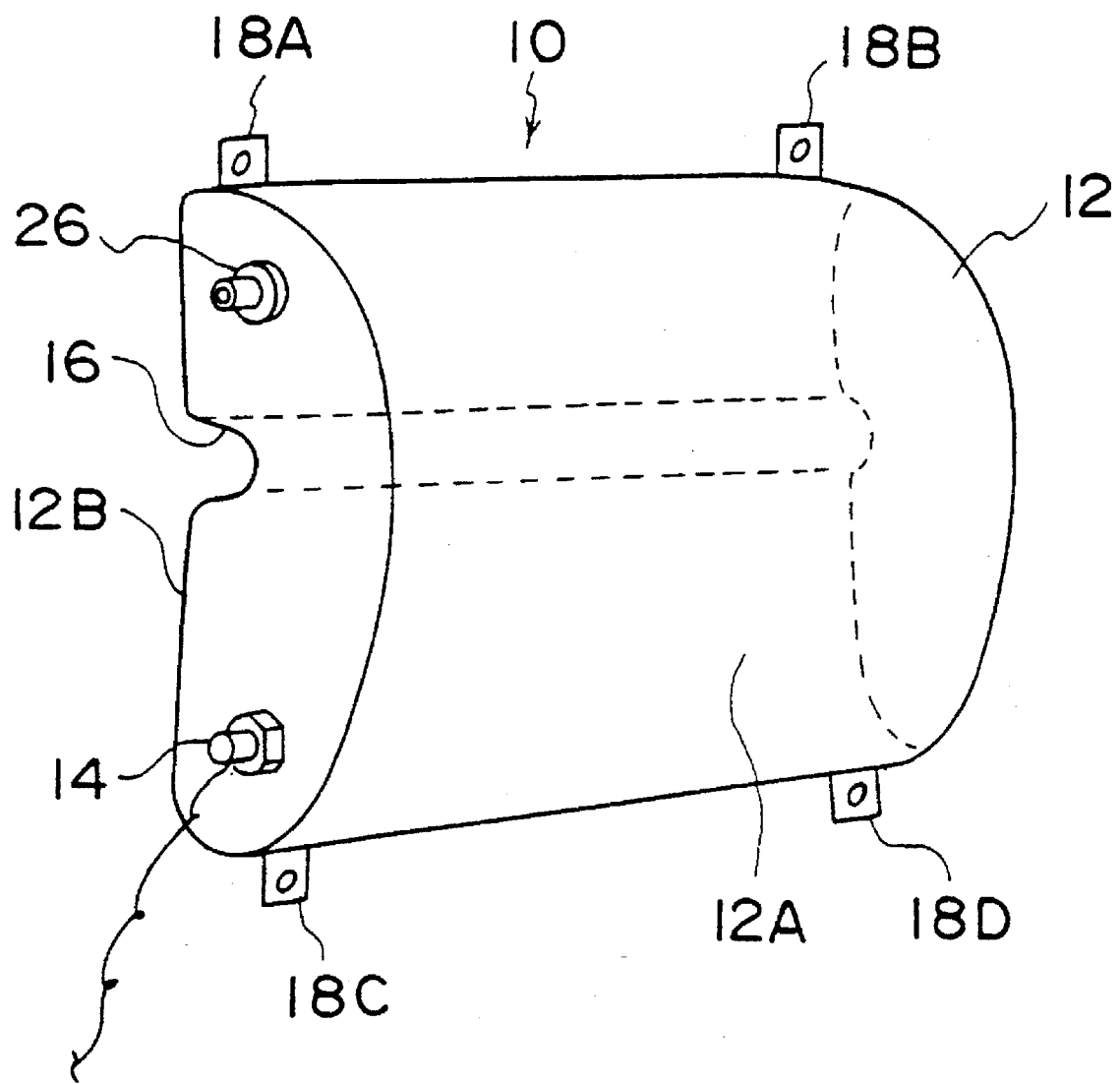
FIG. 2 is an enlarged perspective view of the crush sensor shown in FIG. 1.

In addition, as shown in FIG. 2, a small hole for the venting of a gas is formed in one side wall of the crush box 12, and a resin component 26 serving as a gas-venting member and functioning as a kind of orifice is fitted in this small hole. As the resin component 26, it is preferable to use one in which a hollow cylindrical portion is provided in a through hole formed in a disk-shaped seat plate, and which is provided with a retainer formed on the inner periphery of the through hole in the seat plate so as to allow the resin component 26 to be fixed in the small hole.

If such an arrangement is adopted, in cases where the internal pressure of the crush box 12 changes gradually due to a temperature change, it is possible to cancel the difference in the air pressures in and outside the crush box 12. Furthermore, when the gas (i.e., air) inside the crush box 12 flows outside due to a sudden rise in the internal pressure when the crush box 12 is deformed or crushed, the resin component 26 functions as an orifice for imparting resistance to the gas flow, anti makes it possible to maintain the internal pressure at a high level for a certain period, thereby making it possible to detect a change in the internal pressure by means of the pressure sensor 14. Namely, by virtue of the action of the resin component 26 for gas venting, the crush box 12 maintains a state of equilibrium between the internal pressure and the external pressure in the case of a gradual change in the internal pressure due to an ordinary temperature change. However, during a sudden change in the internal pressure such as when an impact load acts on the pressure-receiving surface 12A and the crush box 12 is crushed, the state of equilibrium between the internal pressure and the external pressure is destroyed, and the crush box 12 is maintained in a substantially sealed (semi-sealed) state so as to allow the internal pressure to change. It should be noted that if a gas-venting small hole is merely formed in the crush box 12 and the diameter of the small hole is set appropriately, it is possible to maintain the crush box 12 in the semi-sealed state in the abovedescribed sense.

The pressure sensor 14 is a sensor for detecting the internal pressure of the crush box 12, and a semiconductor pressure sensor, a capacitive pressure sensor, a pressure switch, or the like can be used as the pressure sensor 14. A preferable type of the pressure sensor 14 is one which is capable of generating a linear electrical signal or switching signal corresponding to the pressure and of measuring the relative pressure with respect to the atmospheric pressure. This is because it can be considered that, under the condition of a fixed temperature, the amount of crush, i.e., the amount of decrease in the volume of the crush box 12, is substantially proportional to the relative pressure of the internal pressure of the crush box 12 with respect to the atmospheric pressure. In this line of thinking, the rate of change over time of the internal pressure P is substantially proportional to the crushing speed. However, since the amount of change of the absolute pressure before and after the occurrence of a crush is equal to the amount of change of the relative pressure, it is possible to use a pressure sensor for measuring the absolute pressure.

Figure 3:
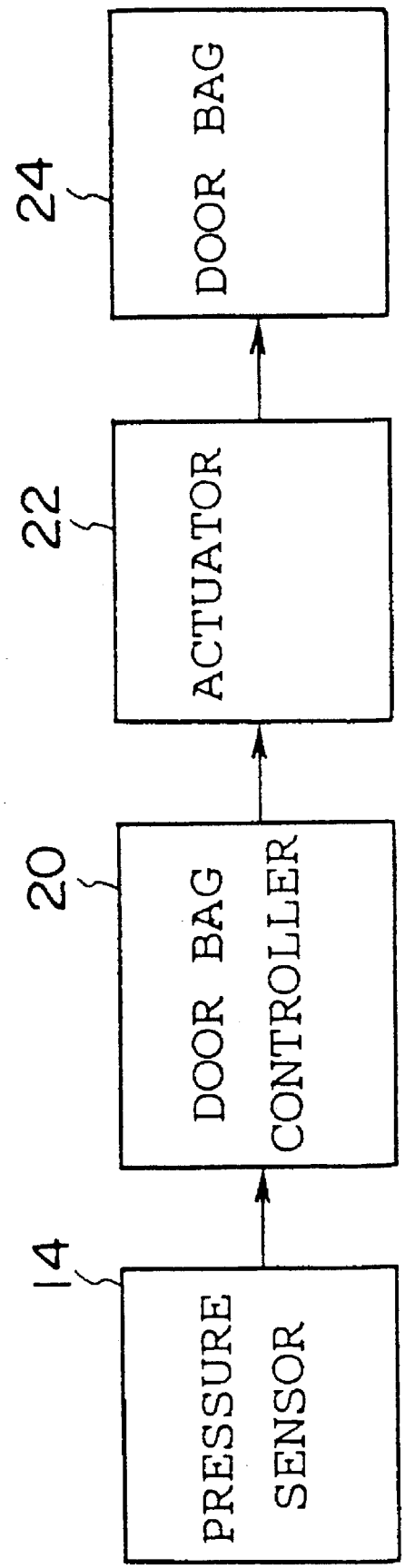
FIG. 3 is a block diagram illustrating an example of a control system which makes use of an output of a pressure sensor constituting a part of the crush sensor shown in FIG. 1.

As shown in FIG. 3, this pressure sensor 14 is connected to a door bag controller 20, which is, in turn, connected to an actuator 22 for actuating a door bag 24. The door bag controller 20 is constituted by a microcomputer, which fetches an output signal from the pressure sensor 14 at intervals of very short durations by means of a clock, measures the internal pressure of the crush box 12, and monitors the change of the internal pressure over time.

Next, a description will be given of the operation of the crush sensor 10 in accordance with the above-described embodiment.

Figure 4:
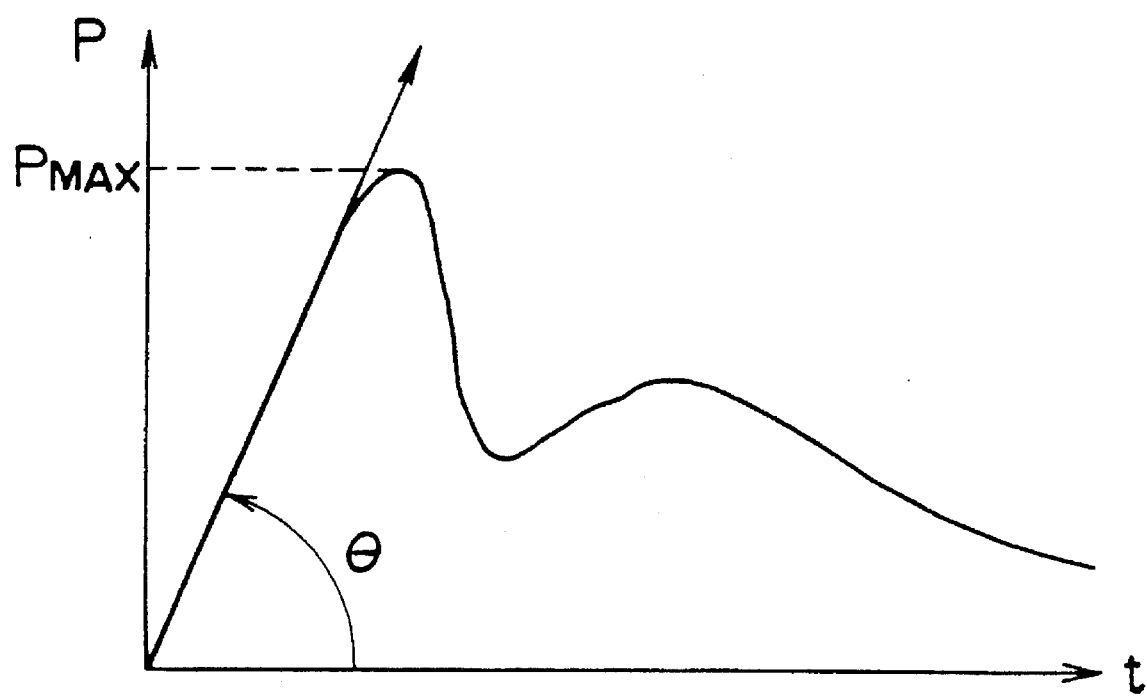
FIG. 4 is a diagram explaining the operation of the embodiment, and illustrates a change over time of the internal pressure of a crush box during crushing.

When a side collision has occurred, and the vehicle-door outer panel 102 is crushed and the pressure-receiving surface 12A of the crush box 12 is crushed, the internal pressure detected by the pressure sensor 14 changes with time t, as shown in FIG. 4.

At this time, it is considered that the tangent $\tan\theta$ of a rising angle $\theta$ of the internal-pressure line, i.e., the rate of change of the internal pressure over time (the rising speed of the internal pressure), is substantially proportional to the crushing speed, and that the maximum value $P_{MAX}$ of the internal pressure is substantially proportional to the total amount of the pressure-receiving surface 12A crushed.

Accordingly, the door bag controller 20 fetches the output signal from the pressure sensor 14 at predetermined sampling intervals, determines the angle $\theta$ and the maximum value $P_{MAX}$ of the pressure. In the event that these values exceed predetermined threshold values, the door bag controller 20 controls the actuator 22 to inflate the door bag 24.

As described above, in this embodiment, by monitoring the change over time of the output (detection) signal of the pressure sensor 14, the rising speed of the internal pressure, which is substantially proportional to the crushing speed, and the maximum value of the internal pressure, which is substantially proportional to the amount of crush, are calculated, and the actuation of the door bag 24 is controlled on the basis of the result of this calculation. Accordingly, it is possible to actuate the actuator 22 only when the crushing speed and the amount of crush are large, i.e., when the inflation of the door bag 24 is actually required.

As described above, in accordance with the present invention, an effect equivalent to that obtained by detecting the amount of crush and the crushing speed can be obtained with a simple arrangement without directly detecting them.

What is claimed is:

1. A crush sensor comprising:

an air tank disposed between a vehicle-door outer panel and a door inner member which make up a vehicle door, such that a pressure-receiving surface of said air tank, which has a predetermined area, is opposed to said vehicle-door outer panel, a gas venting means for maintaining a state of equilibrium between the internal pressure of said air tank and ambient external pressure caused by temperature changes, and for maintaining said air tank in a semi-sealed state such that a sudden change in the internal pressure of said tank only occurs as a result of a rapid crushing of said air tank, and a pressure sensor for detecting the internal pressure of said air tank and outputting an electrical signal proportional to a detected value.

2. A crush sensor according to claim 1, wherein said pressure sensor measures relative pressure of the internal pressure of said air tank with respect to the atmospheric pressure.

3. A crush sensor according to claim 1, wherein said pressure sensor measures absolute pressure within said air tank.

4. A crush sensor according to claim 1, wherein the electrical signal outputted by said pressure sensor includes signals corresponding to a rising speed of the internal pressure of said air tank and a maximum value of the internal pressure of said air tank.

5. A crush sensor according to claim 1, wherein said pressure sensor is disposed in a portion of said air tank excluding the pressure-receiving surface.

6. A crush sensor according to claim 1, wherein said air tank is formed of a hollow, substantially semicylindrical member whose arcuate portion is formed as the pressure-receiving surface.

7. A crush sensor according to claim 6, wherein said air tank has a bracket for fixing said air tank to said door inner member.

8. A crush sensor according to claim 1, wherein said air tank has a recessed portion extending substantially in a longitudinal direction of said vehicle, said recessed portion being disposed in such a manner as to engage with a reinforcing member disposed on said door inner member.

9. A crush sensor according to claim 1, wherein said air tank is formed of one of a resin and a metal.

10. A crush sensor comprising:
- a crush box disposed between a vehicle-door outer panel and a door inner member which make up a vehicle door, such that a pressure-receiving surface of said crush box, which has a predetermined area and an arcuate cross section, is opposed to said vehicle-door outer panel, said crush box being formed of a hollow, substantially semicylindrical member in a semi-sealed state;
- a pressure sensor for detecting an internal pressure of said crush box and outputting signals corresponding to a rising speed of the internal pressure of said crush box and a maximum value of the internal pressure of said crush box; and
- a gas-venting means for maintaining a state of equilibrium between the internal pressure of said crush box and ambient external pressure caused by an ambient temperature change, and for maintaining said crush box in said semi-sealed state such that a sudden change in the internal pressure of said crush box only occurs as a result of a rapid crushing of said crush box.

11. A crush sensor according to claim 10, wherein said pressure sensor measures relative pressure of the internal pressure of said crush box with respect to the atmospheric pressure.

12. A crush sensor according to claim 11, wherein said pressure sensor is one of a semiconductor pressure sensor, a capacitive pressure sensor, and a pressure switch.

13. A crush sensor according to claim 10, wherein said pressure sensor measures absolute pressure within said crush box.

14. A crush sensor according to claim 13, wherein said pressure sensor is one of a semiconductor pressure sensor, a capacitive pressure sensor, and a pressure switch.

15. A crush sensor according to claim 10, wherein said pressure sensor is disposed on an axial-end surface of said crush box.

16. A crush sensor according to claim 10, wherein said crush box has a bracket for fixing said air tank to said door inner member.

17. A crush sensor according to claim 10, wherein said crush box has a recessed portion extending substantially in a longitudinal direction of said vehicle, said recessed portion being disposed in such a manner as to engage with a reinforcing member disposed on said door inner member.

18. A crush sensor according to claim 10, wherein said crush box is formed of one of a resin and a metal.

19. A crush sensor according to claim 10, wherein said gas-venting means has a hollow cylindrical portion which extends through a wall portion of said crush box, and said hollow cylindrical portion functions as an orifice for air inside the crush box.

* * * * *